United States Patent [19]
Fazzina et al.

[11] 3,852,501
[45] Dec. 3, 1974

[54] PROCESS FOR IMPARTING THE TASTE, TEXTURE, AND APPEARANCE OF FAT FRYING TO FOODSTUFFS WHICH ARE BAKED

[75] Inventors: Thomas Laurence Fazzina, Naperville; Daniel Robert McSweeney, Lombard; Gregory Jay Gilmore, Chicago, all of Ill.

[73] Assignee: General Foods Corporation, White Plains, N.Y.

[22] Filed: Dec. 15, 1971

[21] Appl. No.: 208,390

[52] U.S. Cl. ............... 426/293, 426/92, 426/154, 426/177, 426/199
[51] Int. Cl. ............................................. A22c 18/00
[58] Field of Search .......... 99/1, 94, 107, 111, 169; 426/92, 194, 199, 224, 289, 295, 296, 363, 102, 154, 156, 162, 177, 208, 293, 215, 251, 305, 345, 347, 350, 362, 372

[56] References Cited
UNITED STATES PATENTS

| | | | |
|---|---|---|---|
| 3,582,350 | 6/1971 | Werbin et al. | 99/94 |
| 3,586,512 | 6/1971 | Mancuso et al. | 99/107 X |
| 3,669,674 | 6/1972 | Klug et al. | 99/1 |
| 3,723,137 | 3/1973 | Fischer et al. | 99/107 x |

*Primary Examiner*—Hyman Lord
*Attorney, Agent, or Firm*—Bruno P. Struzzi; Thomas V. Sullivan; William J. Speranza

[57] ABSTRACT

A powdered coating composition for imparting a fat fried texture, appearance, and taste to baked foodstuffs which includes farinaceous materials, edible shortening, modified starch and a corn starch hydrolyzate, and which is particularly characterized by its ability to form a continuous crisp coating over all surfaces of the foodstuff during baking to provide a fat fried-like appearance.

3 Claims, No Drawings

PROCESS FOR IMPARTING THE TASTE, TEXTURE, AND APPEARANCE OF FAT FRYING TO FOODSTUFFS WHICH ARE BAKED

BACKGROUND OF THE INVENTION

This invention relates to edible food coatings and more particularly is directed to a food coating to be applied to the food prior to baking for imparting a fat fried appearance, texture, and taste to the baked food.

Many foods such as poultry, meat, fish and vegetables are breaded with a light coating of flour or breadcrumbs which on frying in oil develops into a characteristic crispy, brown-colored coating.

However, the messiness involved with the preparation of fried foods, the ever-present danger of spattering oil, and the unfavorable dietary aspects associated with fried foods have led recently to the development of coatings which attempt to impart a fried appearance to a foodstuff which is baked and yet retain the appealing color, taste, and texture associated with fried foods.

An example of such a coating is found in Mancuso, et al., U.S. Pat. No. 3,586,512 which discloses a dry coating employing food coloring to be applied to a foodstuff prior to baking to simulate a fried-like color. Though this product is successful in this respect, improvement would be desirable particularly in more closely simulating the texture and mouthful characteristic of fat fried foods over the grainy, granular appearance noticeable in the above-mentioned prior art product. It is especially important that such a coating composition have the ability to form a continuous, crisp coating over all surfaces of the foodstuff when it is baked in an oven employing normal baking temperatures.

SUMMARY OF THE INVENTION

Accordingly, it is an object of this invention to provide an edible food coating which will form a continuous, crisp, fat fried-like coating when applied to foodstuffs.

It is another object of this invention to provide an edible food coating in powdered, flowable form which may be readily applied to the foodstuff and does not have to be prepared in batter form.

Still another object is to prepare a foodstuff which closely resembles a fat fried food product by coating the foodstuff with a dry composition and subsequently baking the coated foodstuff in an oven.

These objects are achieved by the discovery that a baked foodstuff may be prepared which closely resembles a fried product in appearance, texture and taste by coating the foodstuff prior to baking with a dry coating mixture consisting essentially of farinaceous material, edible shortening, modified starch and a corn starch hydrolyzate.

DETAILED DESCRIPTION OF THE INVENTION

The edible food coating of this invention is a dry, flowable mix which is applied to a wetted foodstuff, particularly meats such as chicken and pork. The coated food is then baked until done resulting in a foodstuff which closely resembles its fat fried counterpart. The nature of the baked coating is much like fat fried since each of the ingredients has a physical function during baking which, when taken together, simulate closely the effect of fat frying on a breaded foodstuff.

As previously stated, the coating of this invention consists essentially of a dry mixture of modified starch, a corn starch hydrolyzate, farinaceous material and edible shortening. Mixes made from the above ingredients in certain amounts and coated onto a moist foodstuff produce a matrix of the corn starch hydrolyzate and farinaceous material which, during heating, forms a molten film over the surface of the product due to the fact that the hydrolyzate melts in moist heat.

The corn starch hydrolyzate of this invention is a corn starch product which has been modified by hydrolysis and is intended to include hydrolysis products such as dextrin, corn syrup, corn syrup solids, corn sugar, (dextrose) and the like. One destinguishing factor among these products is their Dextrose Equivalent (DE) which may be varied widely according to the desired sweetness of the final coating composition while still retaining its matrix forming ability.

The farinaceous material is usually a flour prepared from wheat, corn, or oats or mixtures of these grains. Though the particle size of the corn starch hydrolyzate and farinaceous material is not critical, it should be of a fineness sufficient to assure proper blending with the other ingredients, preferably about minus U.S. No. 30 mesh.

The quantities of the starch hydrolyzate and farinaceous materials employed in the food coating mix are those necessary to produce the above mentioned molten film upon heating. Too much farinaceous material or too little starch hydrolyzate produces a non-molten powder, while the reverse produces a matrix which is too gummy to be acceptable. These quantities are preferably 15–35 percent of a suitable corn starch hydrolyzate and 8–35 percent farinaceous material based on the weight of the final dry coating mixture. Employing quantities within these ranges, the matrix solidifies upon baking to form a uniform, crisp coating as cooking reaches the endpoint.

Dispersed throughout the above matrix is the edible shortening and modified starch. The modified starch is preferably a non-gelatinized food starch. During cooking, and with the help of the moisture produced by the cooking foodstuff, the starch partially gelatinizes and contributes a flaky, crisp property to the matrix. Hence, depending upon the desired crispness of the final baked foodstuff, the starch of the coating mix may also be a partially gelatinized food starch which further gelatinizes during baking.

Suitable starches which may be used in accordance with this invention are corn starch, waxy-maize starch, sorghum, tapioca, and the like. Again, the quantity of food starch employed is somewhat critical in that too little produces a non-crisp coating and too much produces a powdery, granular coating. The range employed is preferably 5–18 percent based on the weight of the final coating mixture.

Also during cooking, the shortening melts and enrobes all parts of the coating so as to spread out any material that may remain as a dry powder. The shortening effects a greater retention of moisture and juice in the foodstuff adding greatly to the texture and appearance of the final baked product. A coating mixture without shortening results in a foodstuff which is dry and powdery. It has been found that the proportional quantity of shortening necessary to produce the above mentioned effects is preferably 10–50 percent by weight of the final coating mixture.

The shortening may be any solid vegetable or animal shortening in powdered form, and preferably, hydrogenated vegetable oils such as corn oil, cottonseed oil and the like. It is desirable that the shortening have a softening point of 100°–145°F. Particle size, though not critical, should be of sufficient fineness and similarity to the other ingredients to insure proper blending and uniform coating.

The balance of the coating mix is made up of fillers, bulking agents, spices, colorings, salts and seasonings. Since the coating is applicable to a wide variety of foodstuffs, it is desirable to formulate a variety of coatings each employing such seasonings, spices, etc. which enhance the flavor of the particular food to be coated.

In practice, the food coating mix is packaged in an envelope or package which is hermetically sealed to prevent moisture pick-up prior to use. Preferably, the consumer places a piece of wetted foodstuff into a plastic bag containing the contents of the envelope, and shakes the bag to achieve a uniform distribution of the coating mix on the foodstuff. The coated foodstuff is then baked in an oven until done.

The following examples describe specific embodiments of the invention.

EXAMPLE I

The following ingredients are dry mixed to form a coating composition:

| | |
|---|---|
| Dextrin (10 DE) | 23.00 Parts |
| Bread Crumbs | 25.00 |
| Shortening | 20.00 |
| Wheat Flour | 10.00 |
| Modified ungelatinized Waxy Maize Starch | 10.00 |
| Salt | 7.00 |
| Pepper (med. grind) 0.50 | |
| Food Colors | 0.38 |
| Caramel Color | 0.07 |

EXAMPLE II

Seventy (70) grams of the mixture of Example I were placed in a plastic bag. Moist chicken parts were coated with it and baked at 400°F for 40–50 minutes. The result was an almost identical match in color, flavor, texture and mouthful to fat fried chicken.

EXAMPLE III

A coating for pork was prepared from the following ingredients:

| | |
|---|---|
| Shortening | 18.00 Parts |
| Bread Crumbs | 25.00 |
| Wheat Flour | 10.00 |
| Dextron (10 DE) | 25.00 |
| Modified ungelatinized Waxy Maize Starch | 10.00 |
| Salt | 7.3 |
| Onion Powder | 0.8 |
| Ground Savory | 0.5 |
| Black Papper | 0.5 |
| Food Color | 0.4 |

Pork chops were moistened with milk and coated with the above blend in a plastic bag. The coated pork chops were baked in a 420°F oven for 35–45 minutes. The finished product displayed a texture, taste, and appearance closely simulating its fat fried counterpart.

The preferred embodiments illustrated above may of course be modified within the scope of this invention and therefore are not intended to restrict the invention in any way.

What we claim is:

1. A process for imparting the taste, texture, and appearance of fat frying to foodstuffs which are baked, comprising, moistening the surface of a foodstuff, coating the moistened foodstuff with a dry, edible mix consisting essentially of 10–50 percent of an edible powdered shortening, 8–35 percent farinaceous material, 15–35 percent of a corn starch hydrolyzate, and 5–18 percent of a modified food starch, at least some of which food starch is ungelatinized, and baking said coated foodstuff until cooked.

2. The process of claim 1 wherein said corn starch hydrolyzate is a member selected from the group consisting of dextrins, corn syrup solids and corn sugar.

3. The process of claim 2 wherein said modified food starch is ungelatinized waxy-maize.

* * * * *